United States Patent [19]

Kiyono et al.

[11] 4,109,999
[45] Aug. 29, 1978

[54] ILLUMINATING DEVICE FOR SLIT LAMP MICROSCOPES

[75] Inventors: Yutaka Kiyono; Shigeaki Nagata; Shuichiro Shigemori; Tadashi Kishimoto, all of Tokyo; Sadao Maruyama, Koshigaya; Katsuyoshi Arisawa, Tokyo, all of Japan

[73] Assignee: Mamiya Camera Co., Ltd., Japan

[21] Appl. No.: 737,796

[22] Filed: Nov. 1, 1976

[51] Int. Cl.² .................................. G02B 21/06
[52] U.S. Cl. .................................. 350/91; 351/14; 351/16
[58] Field of Search ............ 350/91; 351/14, 16

[56] References Cited
U.S. PATENT DOCUMENTS 3,433,560 3/1969 Gambs .................................. 351/14
3,533,685 10/1970 Littmann et al. .................. 351/14
3,536,383 10/1970 Cornsweet et al. ................ 351/6

FOREIGN PATENT DOCUMENTS 1,466,064 12/1966 France .................................. 351/16

Primary Examiner—John K. Corbin
Assistant Examiner—Matthew W. Koren
Attorney, Agent, or Firm—Cushman, Darby & Cushman

[57] ABSTRACT

An illuminating device for slit lamp microscopes wherein rays reaching an objective through a slit from a light source are so made as to be able to be directed to a position deflected from the optical axis of the objective by displacing or replacing a part of elements forming an illuminating optical system, in order that the illuminating rays may be incident upon an eyeball diagonally from above or below.

17 Claims, 22 Drawing Figures

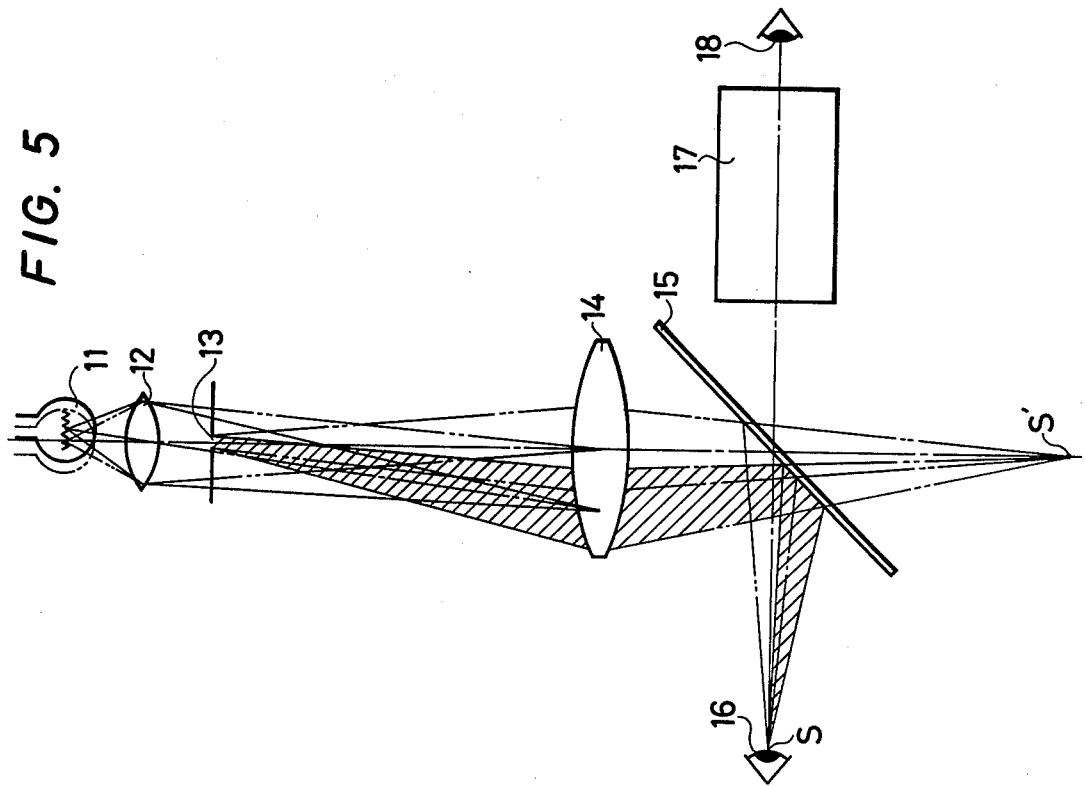
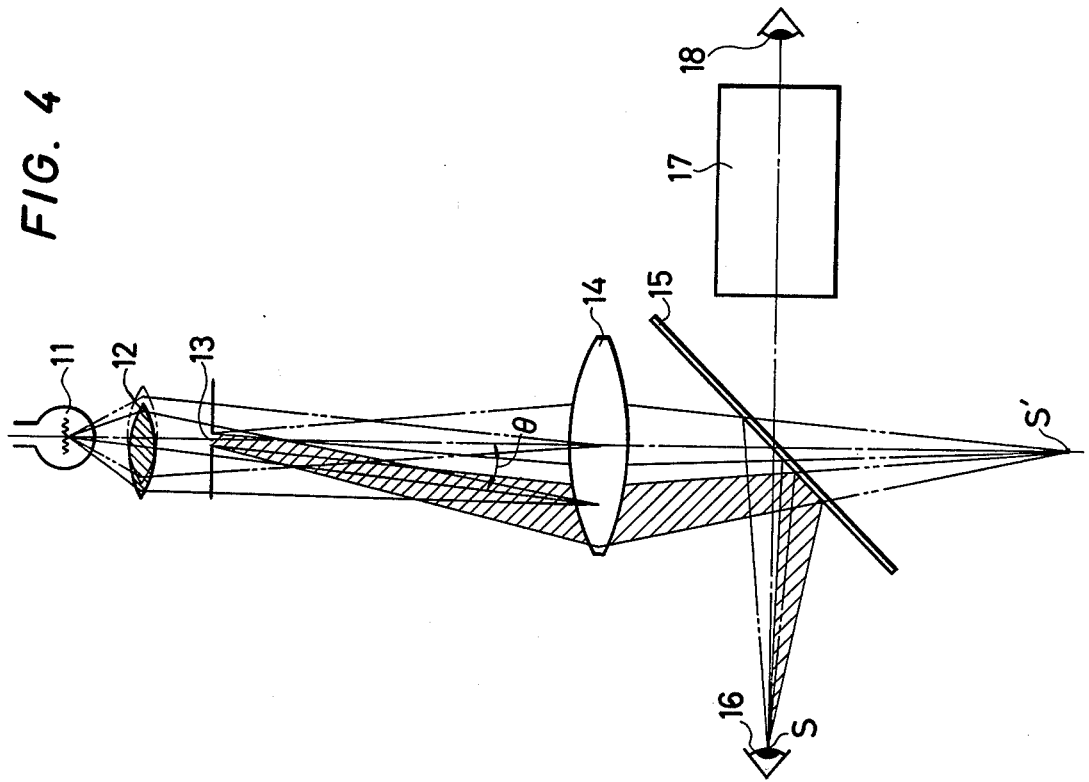

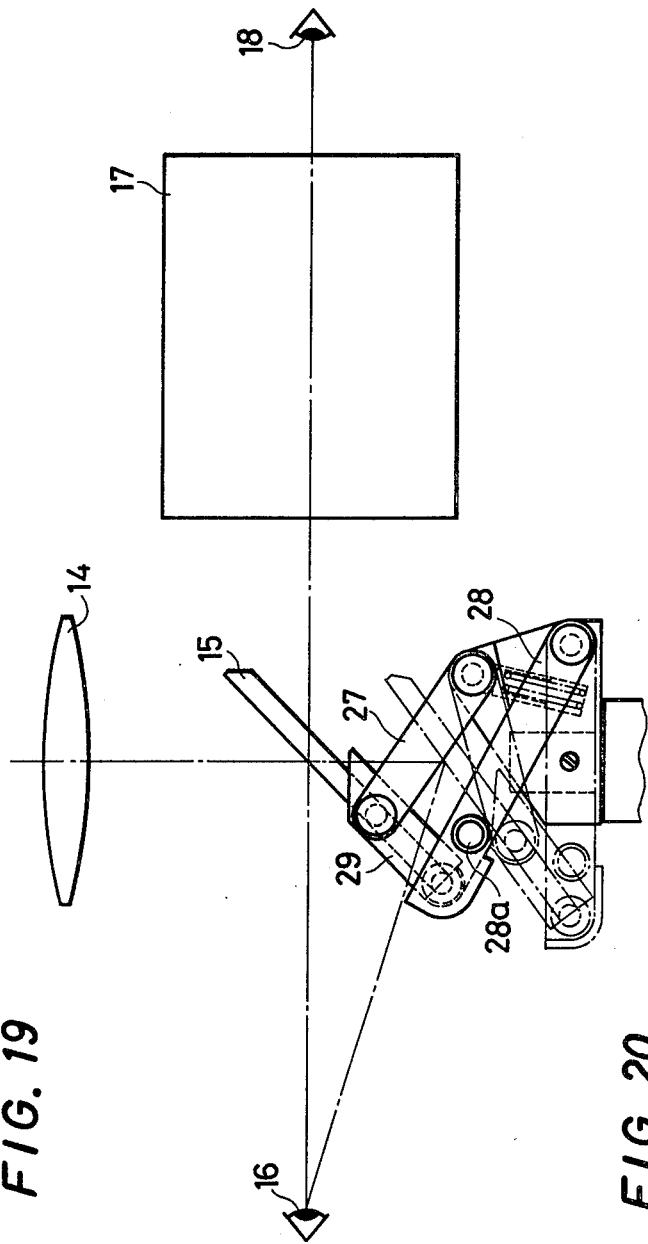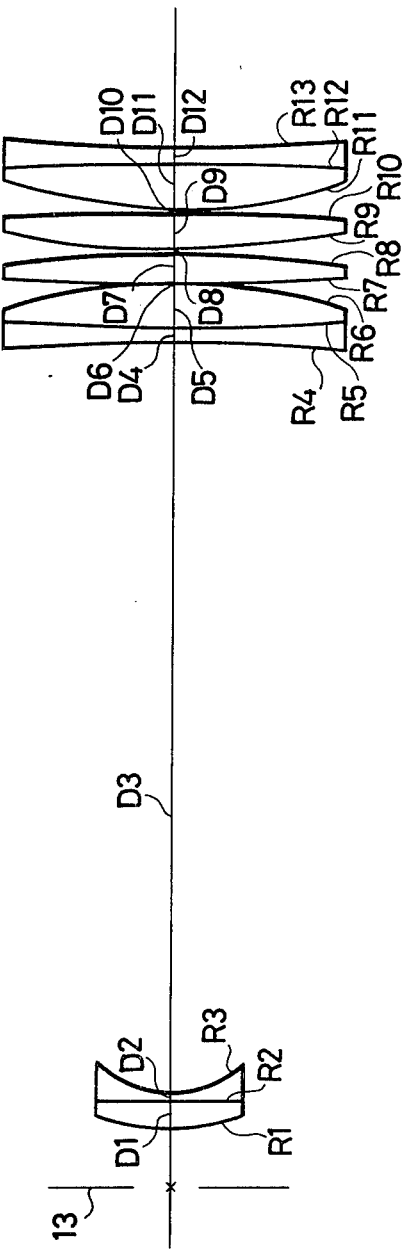
FIG. 19
FIG. 20

ASTIGMATISM

SPHERICAL ABERRATION

4,109,999

ILLUMINATING DEVICE FOR SLIT LAMP MICROSCOPES

BACKGROUND OF THE INVENTION (a) Field of the Invention

The present invention relates to an illuminating device for slit lamp microscopes wherein rays from a light source are so made as to be able to be incident upon an object to be examined diagonally from above or below with respect to the optical axis of the objective.

(b) Description of the Prior Art

A slit lamp microscope whereby such transparent object as a cornea or crystalline body of an eyeball is optically cut by being illuminated with strong slit rays in a diagonal direction so that any minute abnormality within the transparent object may be exposed by diffused rays from fine substances in the transparent body structure and may be magnified and observed with a binocular stereoscopic microscope is so effective to ophthalmic diagnoses as to be already extensively used.

FIG. 1 shows a typical constitution of this kind of known illuminating device for slit lamp microscopes. In the drawing, reference numeral 1 indicates a light source, numeral 2 indicates a condenser lens, numeral 3 indicates a slit arranged on the optical axis of the condenser lens, numeral 4 indicates an objective, numeral 5 indicates reflector so arranged as to be at an angle of 45 degrees with the optical axis of the objective 4, numeral 6 indicates an object to be examined by observation, that is, an eyeball of a patient and numeral 7 indicates a microscope arranged on the side opposed to the side on which the eyeball 6 is located with respect to the reflector 5 on the extension line of the optical axis from the reflector 5 to the eyeball 6. The slit 3 and the surface of the eyeball 6 are conjugate with each other with respect to the objective 4. Therefore, rays issued from the light source 1 pass through the condenser lens 2 and reach the eyeball 6 through the slit 3, objective 4 and reflector 5 and produce a slit image at a point S on the eyeball 6. As a result, the cornea and others of the eyeball 6 are optically cut and are magnified and observed with the microscope 7. In such case, as the direction of the rays from the light source 1 is changed by 90 degrees by the reflector 5, the rays will be incident upon the eyeball 6 in the horizontal direction and, if the reflector 5 is not present, the image of the slit 3 will be produced at the imaginary conjugate point S'. The distances from the reflector 5 to the points S and S' are equal to each other. By the way, such slit lamp microscope as is shown in FIG. 1 is so made that the rays may be incident upon the eyeball 6 diagonally from the right or left by being rotated in a horizontal plane with the point S as rotating center.

As described above, according to this kind of illuminating device for slit lamp microscopes, the rays are incident upon the object to be examined in the horizontal direction and the object to be examined can be optically cut in various directions in the horizontal plane by moving the slit rays to the right and left in the horizontal plane. Depending on the condition of the disease of the eye of the patient, it is required to optically cut the object to be examined in various directions diagonally above or below the horizontal plane by moving the slit rays up or down with the point S as a center. The first type of illuminating device which can meet such requirement is shown in FIG. 2. That is to say, the first type of illuminating device for slit lamp microscopes is so arranged to observe the eyeball 6 with the microscope 7 that the entire illuminating optical system including the light source 1, condenser lens 2, slit 3 and objective 4 may be moved in a plane parallel with the paper surface (for example, from the position shown by the chain lines to the position shown by the solid lines) with an axis 8 provided in the position of the imaginary conjugate point S' as a center without moving the reflector 5 and microscope 7 and the slit rays may be thereby incident upon the eyeball 6 diagonally from below or above without varying the light path length. However, in the case of this system, there are defects that the entire comparatively large and heavy illuminating device must be inclined, that therefore a considerable strength and size are required for the supporting mechanism and that the entire slit light microscope apparatus must be large.

The second type of known illuminating device which can meet the above mentioned requirement is shown in FIG. 3. The second type of illuminating device for slit lamp microscopes is arranged as mentioned below. That is to say, a microscope 10 is so held that the optical axis between it and an eyeball 9 may be horizontal with the eyeball 9, and a reflector 11 so arranged as to be movable vertically to the optical axis between the eyeball 9 and microscope 10 and to be at an angle of 45 degrees with the optical azis as shown by the chain line in the normal state but to vary in the angle of inclination when moved vertically is provided between the eyeball 9 and microscope 10. Rays from a light source not illustrated reach the reflector 11 through an objective 12 vertically to the above mentioned optical axis from below and are reflected there to be directed to the eyeball 9. The objective 12 is divided into a group 12a on the side near to the reflector 11 and a group 12b on the side near to the light source and the rays between both lens groups 12a and 12b are so made as to be parallel rays. The lens group 12a is also so arranged as to be able to be lowered to the solid line position from the chain line position simultaneously with the lowering of the reflector 11 from the chain line position to the solid line position while varying its angle of inclination so that the distance from the lens group 12a to the reflector 11 and the distance from the reflector 11 to the eyeball 9 may be equal to each other, for example, to make the slit rays incident upon the eyeball diagonally from below. Thus, according to the second type, there are defects that, simultaneously with the vertical movement of the reflector 11 while varying its angle of inclination, the lens group 12a must be moved vertically by the corresponding distance as operatively connected with this movement and that therefore a very complicate operatively connecting mechanism is required.

SUMMARY OF THE INVENTION

Therefore, a primary object of the present invention is to provide an illuminating device for slit lamp microscopes whereby an object to be examined can be illuminated diagonally from above or below by displacing or replacing a part of elements forming an illuminating optical system.

Another object of the present invention is to provide an illuminating device for slit lamp microscopes whereby, in the case of optically cutting an object to be examined by illuminating it diagonally from above or below, it will be able to be cut very clearly.

A further object of the present invention is to provide an illuminating device for slit lamp microscopes whereby an object to be examined can be illuminated diagonally from above or below at an angle large enough.

Another object of the present invention is to provide a slit lamp microscope which is simple to operate and can be made small in the size. These and other objects of the present invention will become more apparent during the course of the following detailed description and appended claims.

BRIEF DESCRIPTION OF THE DRAWINGS

FIGS. 4 to 19 are respectively explanatory views showing the arrangements of different embodiments of illuminating devices for slit lamp microscopes according to the present invention;

FIG. 20 is an arrangement view of an embodiment of an objective to be applied to the illuminating device for slit lamp microscopes according to the present invention.

DETAILED DESCRIPTION OF THE PREFERRED EMBODIMENTS

Figure 1:
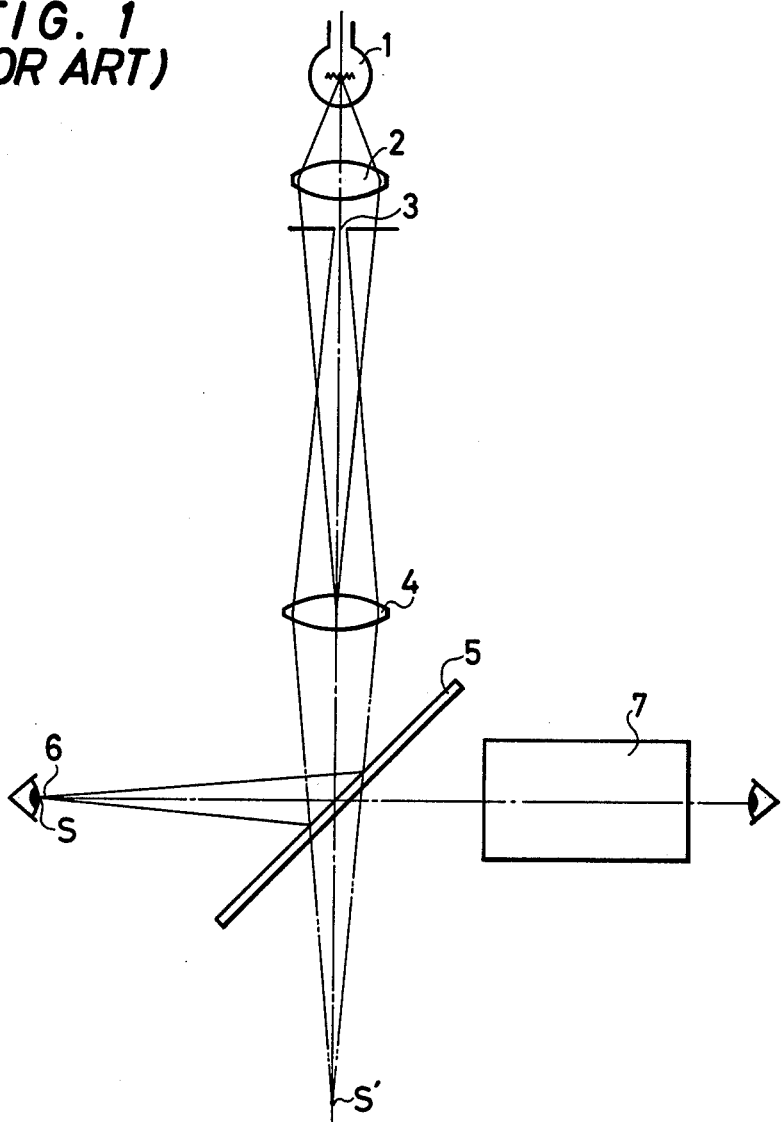
FIG. 1 is an explanatory view showing a typical conventional arrangement of an illuminating device for slit lamp microscopes.
Figure 2:
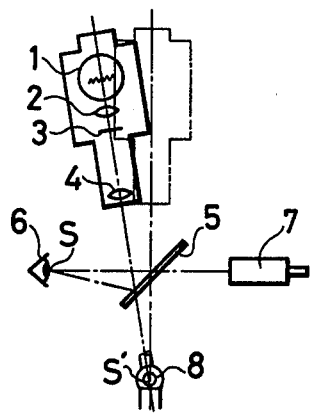
FIGS. 2 and 3 are respectively explanatory views for explaining two different conventional methods in the case of illuminating an eyeball diagonally from below or above.
Figure 3:
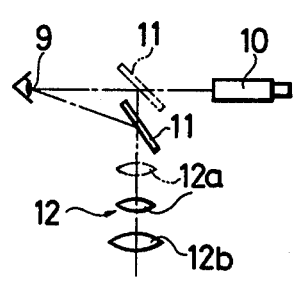

In the respective embodiments of the illuminating devices for slit lamp microscopes according to the present invention to be explained in the following, the same reference numerals are attached to the same respective elements.

With reference to FIG. 4, reference numeral 11 indicates a light source, numeral 12 indicates a condenser lens provided movable in the direction perpendicular to the optical axis, numeral 13 indicates a slit, numeral 14 indicates an objective of a large diameter, numeral 15 indicates a reflector so arranged as to be at an angle of 45 degrees with the optical axis, numeral 16 indicates an eyeball (an object to be examined or an eye of a patient) to be observed. Numeral 17 indicates a microscope (generally a binocular stereoscopic microscope) for observing the optically cut eyeball 16. Numeral 18 indicates an eye of the observer. Generally the condenser lens 12 is so arranged as to produce a light source image near the objective 14 or reflector 15. However, in this embodiment, it is to produce the image near the position of the principal point of the objective 14. In this embodiment, when the condenser lens 12 is aligned on the optical axis of the objective 14 with the light source 11 and slit 13, that is, when the optical axis of the objective 14 coincides with that of the condenser lens, the rays issued from the light source 11 will pass through the objective 14 through the condenser lens 12 and slit 13, will be reflected to be in the horizontal direction by the reflector 15, will reach the eyeball 16 and will be focused at the point S. In this case, as the slit 13 and the surface of the eyeball 16 are so positioned as to be conjugate with each other with respect to the objective 14, the slit image will be produced at the point S and, as a result, the eyeball 16 will be optically cut. The thus optically cut eyeball is magnified and observed by the microscope 17. Then, if the condenser lens 12 is moved leftward in the horizontal direction from this state, the principal ray of light from the light source 11 will incline leftward, for example, by an angle $\theta$ with respect to the optical axis of the objective 14 as a result. Therefore, the light source image will be focused as deflected leftward from the optical axis of the objective 14 and the rays through the slit 13 will pass through the objective as deflected leftward from the center of the objective 14 as shown by the hatching in the drawing, will proceed toward an imaginary conjugate point S' and will be reflected by the reflector 15. Therefore, the reflected rays will be incident upon the point S on the eyeball 16 diagonally from below and will be optically cut as a result. This state is observed by the microscope 17. If the condenser lens 12 is moved rightward in the horizontal direction, reversely to the above described case, the principal ray of light from the light source 11 will move rightward and the rays through the slit 13 will pass through the objective as deflected rightward from the center of the objective 14 and will be therefore incident upon the point S diagonally from above as a result. Thus, when the condenser lens 12 is moved leftward or rightward in the plane intersecting rectangularly with the optical axis, such object to be examined as the eyeball 16 will be optically cut diagonally from below or above the horizontal plane. Such cutting can be also made by moving the condenser lens 12 along an arcuate surface having a proper point on the optical axis of the objective 14 as a center.

Figure 6:
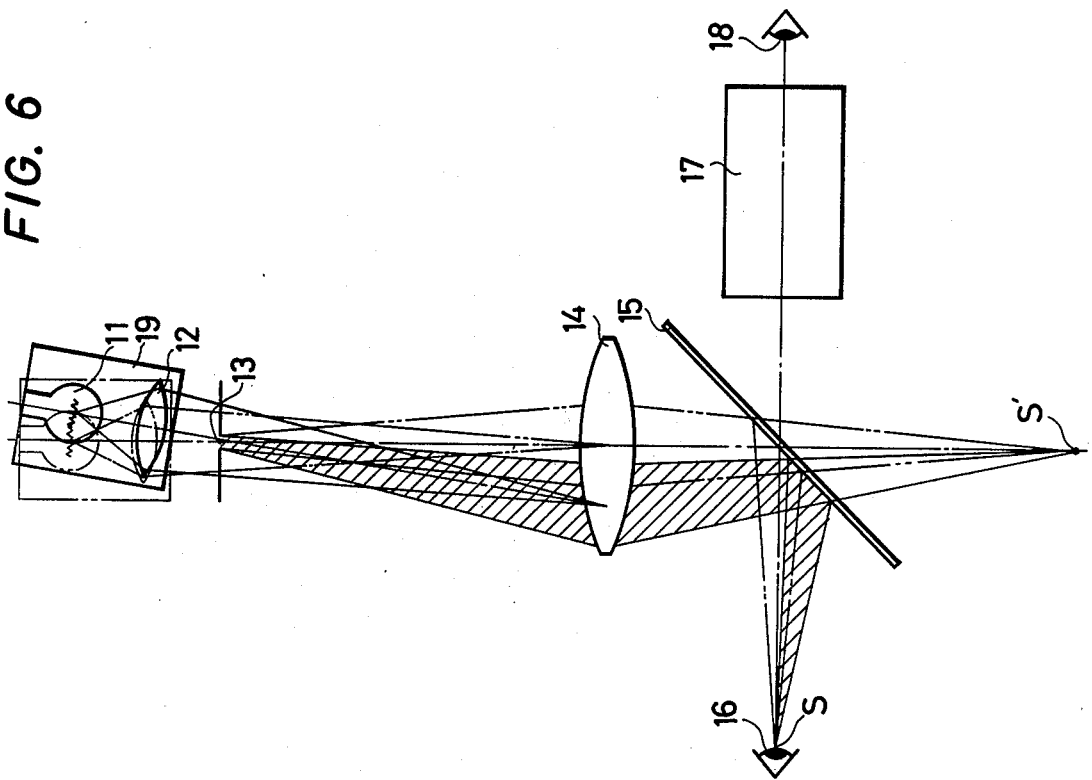
Figure 7:
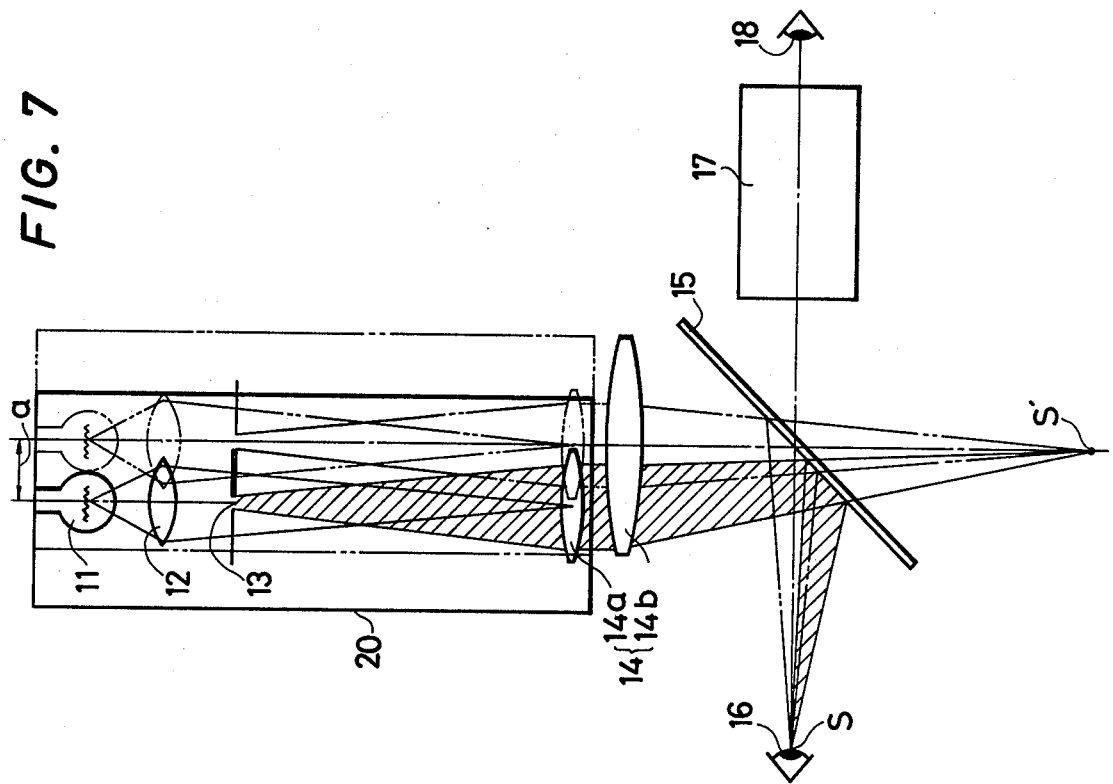

FIG. 4 shows an embodiment wherein, when only the condenser lens 12 is moved, the eyeball 16 will be optically cut diagonally from below or above the horizontal plane. However, the same result will be obtained when (i) the light source 11 is moved in a plane perpendicular to the optical axis of the objective 14 or in a plane approximate to it, (ii) the light source 11 and condenser lens 12 are integrally rotated with the slit 13 as a center while their relative positions are kept constant as they are or (iii) the objective 14 is formed of a lens group located on the side near to the slit 13 and a lens group located on the side near to the reflector 15 and the light source 11, condenser lens 12, slit 13 and lens group located on the side near to the slit 13 of the objective 14 as aligned on a common optical axis are moved in parallel with the optical axis of the group located on the side near to the reflector 15 of the objective 14 while their relative positions are kept constant as they are. That is to say, in FIG. 5, an embodiment in the case of the system of (i) above is shown by the same indicating method as is shown in FIG. 4. In this embodiment, when the light source 11 is moved in the horizontal or substantially horizontal direction from the normal position shown by the chain lines to the position shown by the solid lines, the rays through the slit 13 will reach the point S through the range shown by the hatching in the drawing and will optically cut the eyeball 16 diagonally from below. Further, if the light source 11 is moved leftward in the same manner from the normal position, the eyeball 16 will be optically cut diagonally from above. Then, FIG. 6 shows an embodiment in the case of the system of (ii) above. In this embodiment, the light source 11 and condenser 12 are housed in a light source case 19 which is made rotatable with the slit 13 as a center. For example, if the light source case 19 is rotated rightward from the normal position shown by the chain lines to the position shown by the solid lines to incline the optical exis of the condenser lens 12 leftward by an angle $\theta$ with respect to the optical axis of the objective 14, the rays through the slit 13 will pass through a position deflected leftward from the center of the objective 14 as shown by the hatching in the drawing, will proceed toward the imaginary conjugate point S', will be reflected by the reflector 15, will reach the point S diagonally from below and will optically cut the eyeball 16 diagonally from below. When the light source case 19 is rotated leftward from the normal position, the eyeball 16 will be optically cut diagonally from above. Further, in FIG. 7 is shown an embodiment in the case of the system of iii) above. In this embodiment, the objective 14 consists of a lens groups 14a and 14b, the rays from the lens group 14a to the lens group 14b are made parallel with the optical axis and the light source 11, condenser lens 12, slit 13 and lens group 14a as aligned on a common optical axis are housed in a light source case 20 which is made movable in the horizontal direction with respect to the lens group 14b. In other words, the optical axis within the light source case 20 is made movable leftward or rightward in parallel with the optical axis of the lens group 14b, that is, the optical axis of the inherent objective. For example, when the light source case 20 is moved leftward from the normal position shown by the chain lines to the position shown by the solid lines to parallelly move the optical axis coming from the light source 11 to the lens group 14a by a distance a from the inherent optical axis, the rays coming from the slit 13 to the lens group 14a will pass through the lens group 14b as deflected leftward from the center of the lens group 14b, will be reflected by the reflector 15 and will reach the conjugate point S diagonally from the below to optically cut the eyeball 16 diagonally from below. Further, when the light source 20 is moved rightward from the inherent optical axis, the rays through the slit 13 will reach the point S diagonally from above and the eyeball 16 will be optically cut diagonally from above, needless to say.

Figure 9:
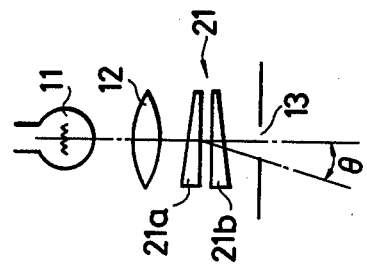
Figure 10:
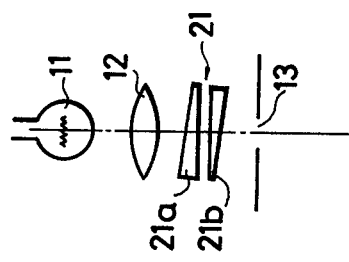
Figure 11:
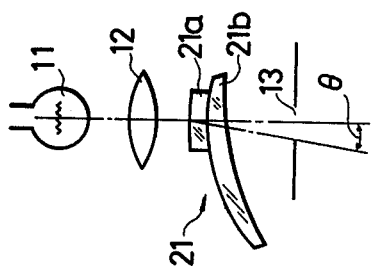
Figure 12:
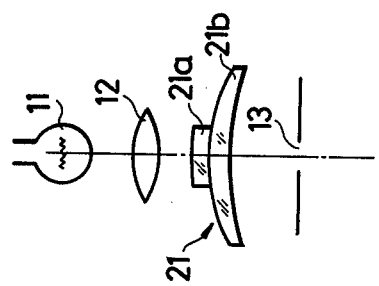
Figure 8:
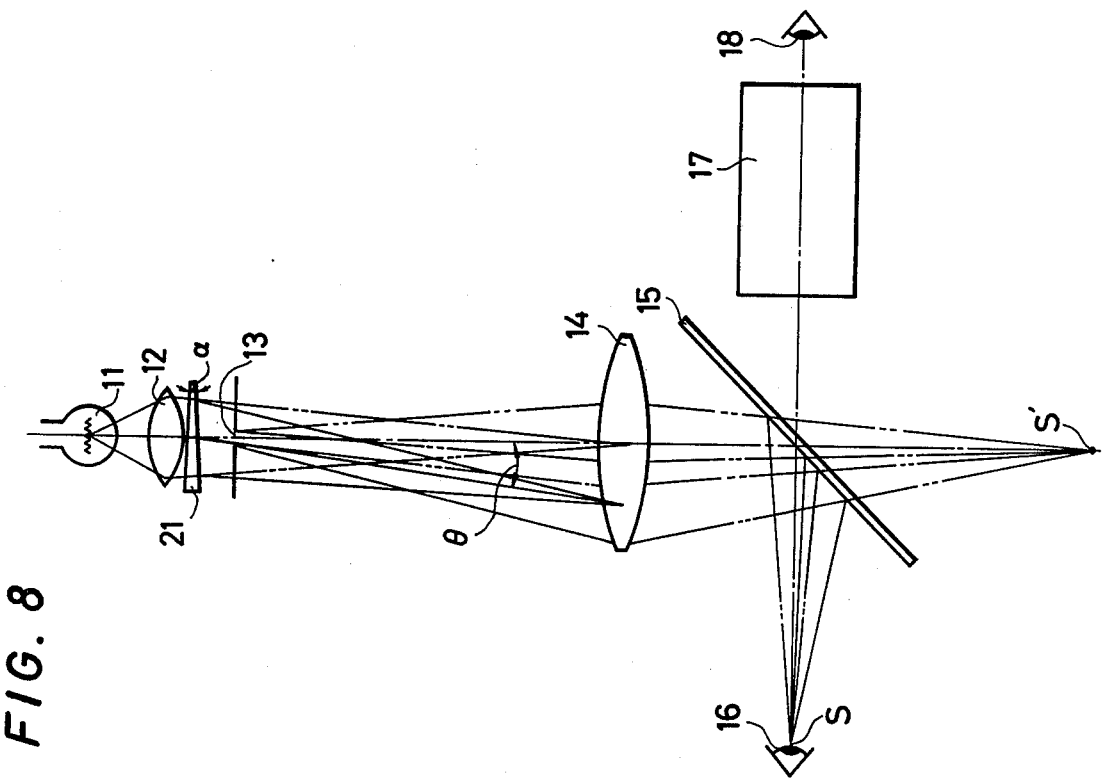

According to each of the above described embodiments, there are advantages when only one or a part of the elements forming the illuminating optical system is displaced, such object 16 to be examined as an eyeball will be able to be optically cut diagonally from above or below, that, therefore, the mechanism of making the displacing operation is simple and that, therefore, the entire slit lamp microscope apparatus can be made small in the size. However, in these embodiments, as the condenser lens 12 is to be made eccentric with the optical axis of the objective 14, there are defects that, in case the object 16 to be examined is optically cut diagonally from above or below, an aberation will be produced and the focusing state will somewhat deteriorate. FIGS. 8 to 17 show some embodiments arranged to eliminate such defects. That is to say, according to the embodiment shown in FIG. 8, a light deflecting element consisting, for example, an optical prism having an apex angle $\alpha$ or the like is provided removably, in the light path between the fixedly arranged condenser lens 12 and the slit 13. Therefore, when a light deflecting element 21 is inserted between the condenser lens 12 and slit 13, the rays from the condenser lens 12 will incline by an angle $\theta$ leftward with respect to the optical axis of the objective 14 and the light source image will be focused in a position deflected leftward from the center of the objective 14. Therefore, the rays through the slit 13 will be deflected leftward from the center of the objective as shown by the hatching in the drawing and, as a result, the eyeball 16 will be optically cut diagonally from below. Further, if the light deflecting element 21 is inserted between the condenser lens 12 and slit 13 in the direction reverse to that shown in the drawing, the rays through the slit 13 will pass through the objective as deflected rightward from the center of the objective 14, will reach the point S diagonally from above and will be focused in that position. Therefore, in this case, the eyeball 16 will be optically cut diagonally from above. FIGS. 9 to 17 show embodiments in the case of using various light deflecting elements of forms different from that in FIG. 8. That is to say, according to the embodiment in FIG. 9, the light deflecting element 21 consists of two prisms 21a and 21b of the same shape which are so arranged as to be repectively rotatable with the optical axis as a center in the plane perpendicular to the optical axis of the condenser lens 12. Therefore, when the two prisms 21a and 21b are so rotated as to occupy such relative positions as shown in FIG. 9, the rays issued from the light source 11 will proceed along the optical axis of the objective 14 through the condenser lens 12 and slit 13 but, when the prisms 21a and 21b are so rotated as to occupy such relative positions as shown in FIG. 10, the rays issued from the light source 11 will be deflected leftward by an angle $\theta$ with respect to the optical axis of the objective 14 by the prisms 21a and 21b through the condenser lens 12 and will pass through the slit 13 and therefore the eyeball 16 will be optically cut diagonally from below in the same manner as in the case shown in FIG. 8. Further, when the prism 21a and 21b are so rotated as to be directed in the direction diametrically reverse to that in FIG. 11 while maintaining the relative positions shown in FIG. 11, the rays issued from the light source 11 and passing through the condenser lens 12 will be deflected rightward and the eyeball 16 will be optically cut diagonally from above. According to the embodiment in FIG. 11, the light deflecting element 21 consists of a fixed concave meniscus lens 21a and a convex meniscus lens 21b slidably contacted on the convex surface with the concave surface of this concave meniscus lens 21a and is so formed that the lens 21b may be movable with respect to the lens 21a from the position shown in FIG. 11 in which their optical axis coincide with the optical axis of the objective 14 to a position (FIG. 12) in which the optical axis of the lens 21b intersects at a fixed angle with the optical axis of the objective 14. Therefore, when the lens 21b is in the position in FIG. 11, the rays issued from the light source 11 will pass through the condenser lens 12, will proceed straight along the optical axis of the objective 14 and will pass through the slit 13 but, when the lens 21b is moved to the position shown in FIG. 12, the rays leaving the condenser lens 12 will be deflected by an agnle $\theta$ with respect to the optical axis of the objective 14 and will pass through the slit 13. Therefore, in this case, the eyeball 16 will be optically cut diagonally from below, as a result. It is needless to say that, when the lens 21b is moved in the direction reverse to that in FIG. 12, the eyeball 16 will be optically cut diagonally from above. By the way, in the case of this embodiment, if cylindrical lenses are used for the lenses 21a and 21b, the angle $\theta$ will be able to be set at any value.

Figure 13:
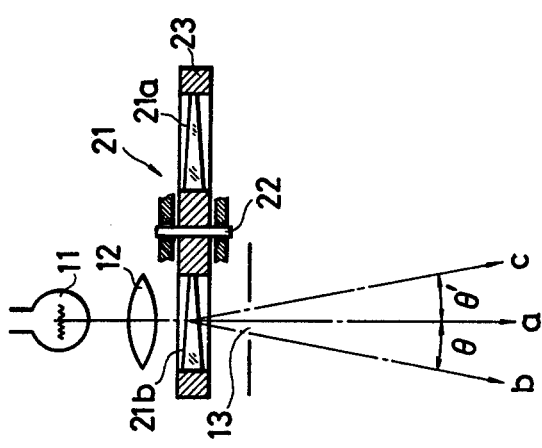
Figure 15:
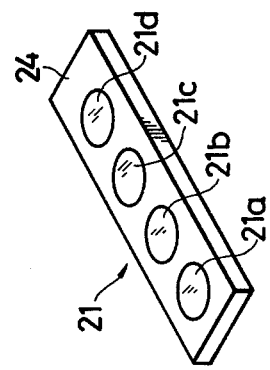
Figure 14:
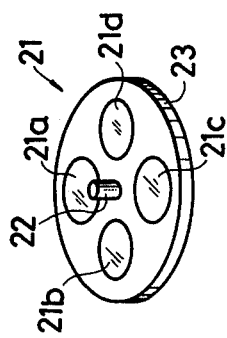

According to the embodiment shown in FIG. 13, the light deflecting element 21 is constituted as a rotary disk 23 supported rotatably by a shaft 22 on the body of the illuminating device and provided concentrically with a plurality of prisms 21a, 21b, 21c and 21d (FIG. 14). One, for example, 21a of the plurality of prisms is of parallel plane glass and the other prisms 21b, 21c and 21d have respectively different apex angles. For example, the prisms 21b and 21c are fitted on the rotary disk so that their pointed end part may be directed to the center of the rotary disk 23. The prism 21d is also fitted on the rotary disk so that its pointed end part may be directed to the outer periphery of the rotary disk 23. When the rotary disk 23 is rotated, these prism will be inserted in turn between the condenser lens 12 and slit 13 as shown in FIG. 13. The rotary disk 23 is so formed as to once stop when the center of each prism coincides with the optical exis of the objective 14. Therefore, when the prism 21a is inserted between the condenser lens 12 and slit 13, the rays from the condenser lens 12 will proceed in the direction indicated by the symbol a along the optical axis of the objective 14. However, when the prism 21b is inserted between the condenser lens 12 and slit 13, the rays will be deflected by an angle $\theta$ with respect to the optical axis of the objective and will proceed in the direction indicated by the symbol b. As a result, the eyeball 16 will be optically cut diagonally from below. When the prism 21d is inserted between the condenser lens 12 and slit 13, the rays from the condenser lens 12 will be deflected by an angle $\theta$ in the direction diametrically reverse to that in the case of inserting the prism 21b with respect to the optical axis of the objective and will proceed in the direction indicated by the symbol c. As a result, the eyeball 16 will be optically cut diagonally from above. Further, it is needless to say that, in case the prism 21c is used, the rays from the condenser lens 12 will be deflected by an angle different from the above mentioned deflecting angle $\theta$. As evident from the above described explanation, the number of the prisms, the value of the apex angle, the direction of the pointed end part and the combination of the prisms can be properly selected as required and further such sliding plate 24 as is shown in FIG. 15 which is slidably mounted on the body of the illuminating device between the condenser lens 12 and slit 13 can be utilized instead of this rotary disk 23.

Figure 16:
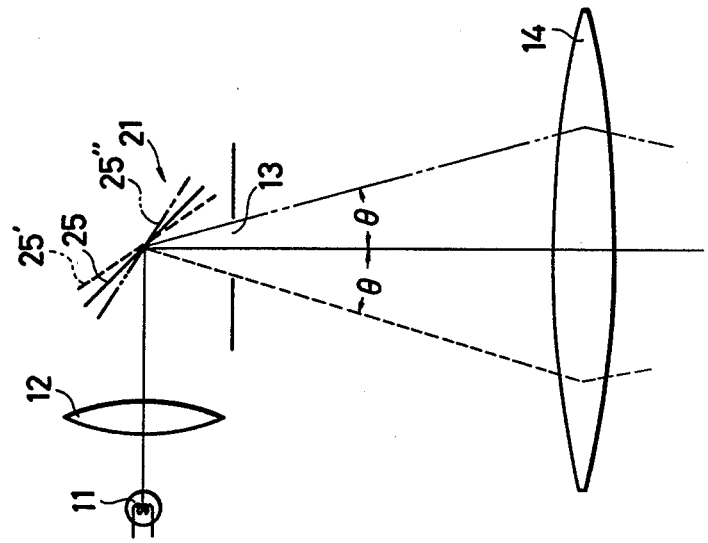

According to the embodiment shown in FIG. 16, the light deflecting element 21 is formed as a reflector 25 which is movabley mounted on the body of the illuminating device between the condenser lens 12 and slit 13 so that the rays from the condenser lens 12 may be directed to the slit 13 as reflected by a right angle or another angle than the right angle. Therefore, when the reflector 25 is inclined by 45 degrees with respect to the optical axis of the condenser lens 12, the rays from the condenser lens 12 will proceed along the optical axis of the objective 14 and will be incident upon the center of the objective 14. However, when the reflector 25 is in a position indicated by 25', the above mentioned rays will be deflected in the direction inclined by an angle $\theta$ leftward with respect to the optical axis of the objective 14. When it is in a position indicated by 25", the above mentioned rays will be deflected in the direction inclined by the angle $\theta$ rightward with respect to the optical axis of the objective 14. Therefore, when the reflector 25 is in the position indicated by 25', the eyeball 16 will be optically cut diagonally from the below and, when it is in the position indicated by 25", the eyeball 16 will be optically cut diagonally from above. In this explanation, the reflector 25 is explained as rotated respectively clockwise and counterclockwise by an equal angle from a position at an angle of 45° with respect to the optical axis of the condenser lens 12. But the rotating angle of the reflector 25 can be freely set.

Figure 17:
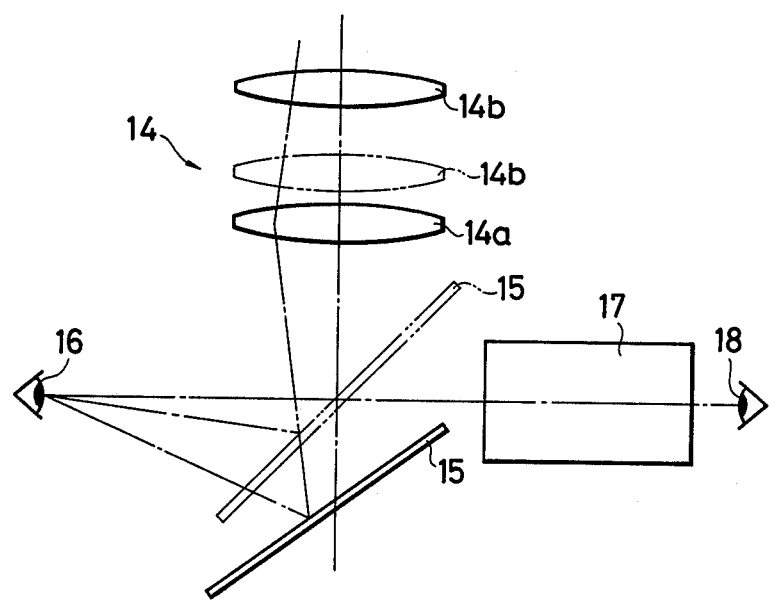
Figure 18:
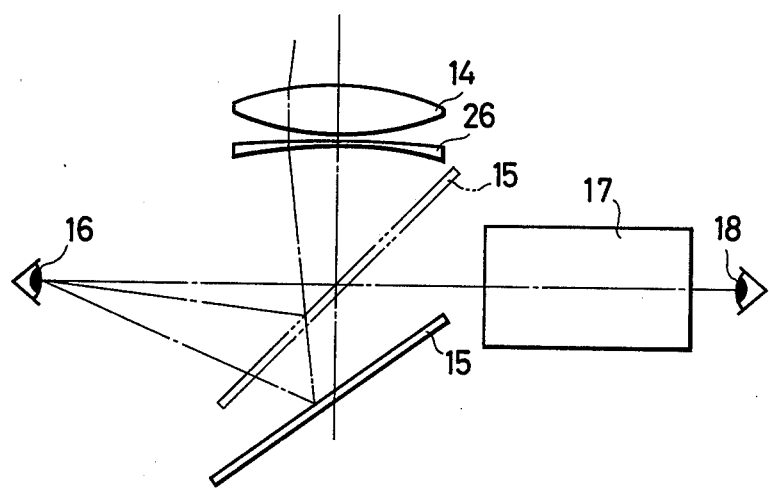
Figure 22:
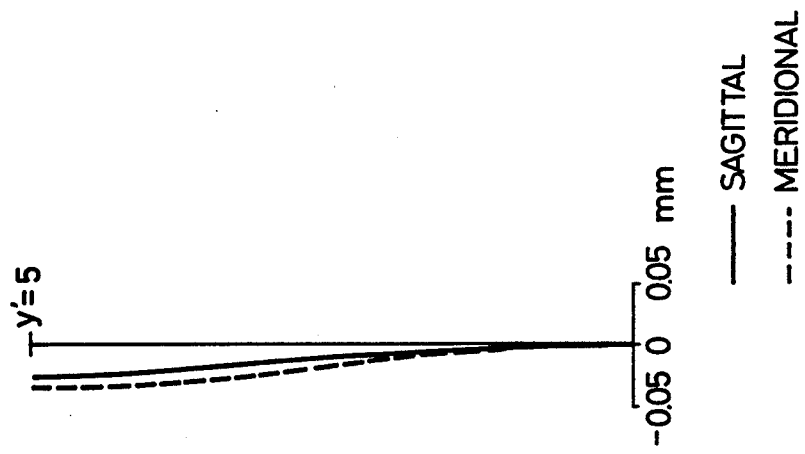
FIG. 21 and FIG. 22 are aberation curve diagrams in the case that the projection magnification of the objective shown in FIG. 20 is -0.63.
Figure 21:
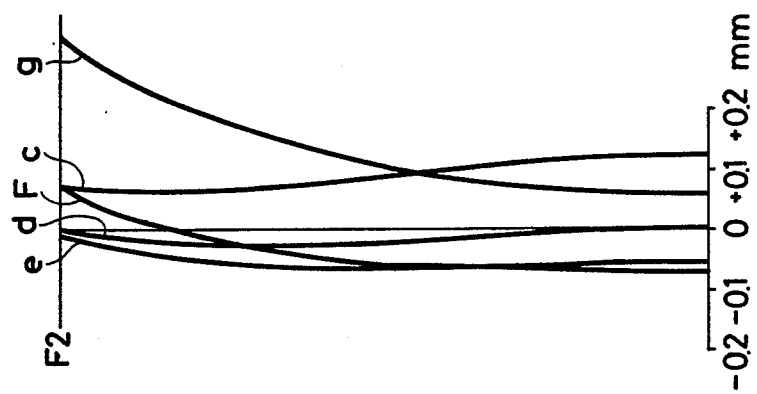

As evident from the above described various embodiments, according to the present invention, the rays through the slit 13 are made to be incident upon the objective 14 in a position deflected from its center so as to optically cut the object 16 to be examined diagonally from above or below and therefore the objective to be used can not help being comparatively large. This is disadvantageous not only to make the entire device small in the size but also to remove various aberations. From such viewpoint, it is desirable to be able to optically cut the object to be examined diagonally from above or below with an angle large enough without making the diameter of the objective too large. FIGS. 17 to 19 show embodiments arranged so as to meet such requirement. That is to say, according to the embodiment shown in FIG. 17, the objective 14 consists of two lens groups 14a and 14b, the lens group 14b is moved, for example, toward the slit 13 to elongate the light path length from the slit 13 to the point S, the reflector 15 is moved in the direction of separating from the lens group 14a while varying the angle with respect to the optical axis of the objective to make the focusing position of the slit image coincide with the object to be examined so that the rays may by incident upon the object 16 to be examined diagonally from below with a large angle. Further, according to the embodiment shown in FIG. 18, such attachment lens 26 as is illustrated is added to the objective 14 and the reflector 15 is moved in the same manner as in the case of the embodiment in FIG. 17 so that the rays may be incident upon the object 16 to be examined diagonally from below with a larger angle. FIG. 19 shows an example of a mechanism for moving the reflector 15 which can be applied to the embodiments in FIGS. 17 and 18. That is to say, according to this embodiment, two arms 27 and 28 different in the length are respectively rotatably supported on the body of the illuminating device and are respectively rotatably connected in the front end parts with the side walls of a holder 29 supporting the reflector 15. A proper frictional force is imparted to each of the pivot parts of the arms 27 and 28 so that, when the reflector 15 is moved, their positions may not freely vary. Therefore, if the reflector 15 is lowered down to the position illustrated by the dotted lines from the position illustrated by the solid lines through a handle 28a provided on the arm 28, the angle of inclination of the reflector 15 with respect to the optical axis of the objective will accordingly vary as illustrated.

As evident from the above explanation, according to the present invention, the object 16 to be examined can be sharply optically cut diagonally from below or above over a large angular range without making the objective so large, that is, without making the entire illuminating device too large.

As described above, according to the present invention, an objective larger than is used for this kind of conventional device is required, the other parts than the center part of the lens are also utilized and therefore it is necessary to remove various aberrations as much as possible. From such viewpoint, in fact, it is favourable that the objective 14 includes a lens group comprising at least two convex lenses each having a $\nu$-value of more than 45 arranged near the reflector 15.

Further, such glasses as are high in the dispersion index $\nu$ and refractive index are generally so few that a glass low in the refractive index can not help being ordinarily utilized. However, if a glass low in the refractive index is utilized, a spherical aberration will be likely to be generated. Therefore, in fact, in order to prevent the generation of such spherical aberration, it is necessary to arrange three or more groups of lens elements near the reflector 15. Further, it is necessary to reduce the curvature of image. However, as already known, in a thin lens contact system, in order to simultaneously reduce the color aberration and Petzval sum, in case the refractive index is $n_1$, and the dispersion index is $\nu_1$, in the convex lens and the refractive index is $n_2$ and the dispersion index is $\nu_2$ in the concave lens, it will be necessary to satisfy the condition of $n_1/n_2 = \nu_1/\nu_2$. If a glass satisfying this condition is selected, the power of each lens element will become so large that the spherical aberration will not be able to be reduced. Therefore, such combination of glasses as is described above can not be used for the objective adapted to the device according to the present invention and therefore, with only the lens elements arranged near the reflector 15, the curvature of image can not be well removed. In case the principal ray passes near the optical axis, as well known, the astigmatism will not be able to be also well removed. Therefore, it is necessary to also control the astigmatism by arranging one or more lens groups on the side near the slit and varying the radius of curvature and thickness of the lens simultaneously with thereby controlling the Petzval sum.

As evident from the above discussion, according to the present invention, there is utilized a structure in which at least three groups of lens elements including at least one convex lens component of $\nu$-value of more than 45 are arranged near the reflector 15 and at least one concave lens group is arranged in position separated from the surface on the side nearest to the slit 13 of said lens group by more than 1/5 the separating distance from said surface. An embodiment of the objective 14 according to the present invention shall be shown in the following with reference to FIG. 20.

| Focal Distance : 39.381 | | | | | | | |
|---|---|---|---|---|---|---|---|
| R1 | 38.16 | D1 | 4. | n1 | 1.62004 | $\nu$1 | 36.3 |
| R2 | 124.26 | D2 | 2. | n2 | 1.51823 | $\nu$2 | 59.0 |
| R3 | 18.96 | D3 | 144.6 | | | | |
| R4 | −416. | D4 | 3. | n3 | 1.69895 | $\nu$3 | 30.1 |
| R5 | 476.33 | D5 | 6.8 | n4 | 1.497 | $\nu$4 | 81.3 |
| R6 | −91. | D6 | 0.2 | | | | |
| R7 | 630. | D7 | 45 | n5 | 1.497 | $\nu$5 | 81.3 |
| R8 | −180. | D8 | 0.35 | | | | |
| R9 | 128. | D9 | 6.4 | n6 | 1.497 | $\nu$6 | 81.3 |
| R10 | −884. | D10 | 0.8 | | | | |
| R11 | 72.84 | D11 | 7.5 | n7 | 1.497 | $\nu$7 | 81.3 |
| R12 | −398.1 | D12 | 2.5 | n8 | 1.69895 | $\nu$8 | 30.1 |
| R13 | 182.46 | | | | | | |

It is needless to say that, in any of the above mentioned embodiments, the entire illuminating device is so formed as to be rotatable in the plane perpendicular to the optical axis of the objective 14 with the conjugate point S as a center so that the object 16 to be examined may be optically cut in various directions in the horizontal plane.

We claim:

1. An illuminating device for slit lamp microscopes comprising a light source, a slit provided in front of said light source, an objective which is provided in front of said slit and can produce the image of said slit on an object to examined, a first reflector which is provided in front of said objective and is arranged diagonally to the optical axis of said objective and can direct rays from said objective to said object to be examined, said objective comprising a first lens group arranged near said first reflector and consisting of at least three groups including at least one convex lens of a $\nu$-value of more than 45 and a second lens group formed as at least one concave lens arranged in a position separated by more than 1/5 the distance between said slit and said first lens group from the surface nearest to said slit of said first lens group between said slit and first lens group, a condenser lens which is provided between said light source and slit and can produce the image of said light source near either one of said objective and reflector, and a means for inclining the rays incident upon said objective from said light source through said condenser lens and slit with respect to the optical axis of said objective, said rays being able to be incident upon said object to be examined diagonally from above or below through said first reflector.

2. An illuminating device according to claim 1 wherein said condenser lens provided movably in the direction intersecting with the optical axis of said objective is used for said means.

3. An illuminating device according to claim 1 wherein said light source provided movably in the direction intersecting with the optical axis of said objective is used for said means.

4. An illuminating device according to claim 1 wherein said illuminating device further comprises a light source case housing said light source and condenser lens and provided so as to be rotatable with said slit as a center.

5. An illuminating device according to claim 1 wherein said objective consists of a first lens group arranged on the side near to said slit and a second lens group arranged on the side near to said first reflector, said illuminating device further comprises a light source case housing said light source, slit and first lens group and movable in parallel with the optical axis of said second lens group and said light source case is used for said means.

6. An illuminating device according to claim 1 wherein said illuminating device further comprises a prism provided removably between said condenser lens and slit and said prism is used for said means.

7. An illuminating device according to claim 1 wherein said illuminating device further comprises a pair of prisms provided so as to be respectively rotatable around the optical axis of said objective between said condenser lens and slit and said pair of prisms are used for said means.

8. An illuminating device according to claim 7 wherein the respective apex angles of said pair of prisms are equal to each other.

9. An illuminating device according to claim 1 wherein said illuminating device further comprises a fixed concave meniscus lens provided between said condenser lens and slit and a convex meniscus lens slidably contacted on the convex surface with the concave surface of said concave meniscus lens, and said concave meniscus lens and convex meniscus lens are used for said means.

10. An illuminating device according to claim 1 wherein said illuminating device further comprises a fixed convex meniscus lens provided between said condenser lens and slit and a concave meniscus lens slidably contacted on concave surface with the convex surface of said convex meniscus lens, and said convex meniscus lens and concave meniscus lens are used for said means.

11. An illuminating device according to claim 1 wherein said illuminating device further comprises a rotary disk provided rotatably between said condenser lens and slit and including a plurality of prisms which can be inserted in turn between said condenser and slit, and said rotary disk is used for said means.

12. An illuminating device according to claim 11 wherein one of said plurality of prisms is of parallel plane glass.

13. An illuminating device according to claim 1 wherein said illuminating device further comprises a sliding plate provided slidabley between said condenser lens and slit and including a plurality of prisms which can be inserted in turn between said condenser lens and slit, and said sliding plate is used for said means.

14. An illuminating device according to claim 13 wherein one of said plurality of prisms is of parallel plane glass.

15. An illuminating device according to claim 1 wherein said illuminating device further comprises a second reflector provided rotatably between said condenser lens and slit to reflect the rays from said condenser lens and lead them into said slit, and said second reflector is used for said means.

16. An illuminating device according to claim 1 wherein said objective consists of a first lens group arranged on the side near to said slit and movable along the optical axis of said objective and a second lens group arranged as fixed on the side near to said first reflector, said first reflector is movable along the optical axis of said objective while varying the angle with said optical axis, and said first reflector will be moved as associated with the movement of said first lens group when said first lens group is moved.

17. An illuminating device according to claim 1 wherein said illuminating device further comprises an attachment lens which can be removably fitted to said objective, said first reflector is movable along the optical axis of said objective while varying the angle with said optical axis, and said first reflector will be moved when said attachment lens is fitted to said objective.

* * * * *